United States Patent [19]

Jones

[11] Patent Number: 4,789,759

[45] Date of Patent: Dec. 6, 1988

[54] ASSEMBLY FOR AN ELECTRICAL CABLE PROVIDING STRAIN RELIEF AND A WATER-TIGHT SEAL

[75] Inventor: Marvin H. Jones, Dillsburg, Pa.

[73] Assignee: AMP Incorporated, Harrisburg, Pa.

[21] Appl. No.: 123,680

[22] Filed: Nov. 23, 1987

Related U.S. Application Data

[63] Continuation-in-part of Ser. No. 843,908, Mar. 25, 1986, abandoned.

[51] Int. Cl.$^4$ ............... F16B 31/02; H02G 15/007
[52] U.S. Cl. ................... 174/65 SS; 285/3; 285/39; 411/1; 411/410
[58] Field of Search ............. 174/65 R, 65 SS, 77 R; 439/449, 452, 461, 462; 248/56; 411/1, 2, 402, 410; 403/2; 285/3, 39

[56] References Cited

U.S. PATENT DOCUMENTS

| | | | |
|---|---|---|---|
| 3,444,775 | 5/1969 | Hills | 85/61 |
| 3,485,517 | 12/1969 | Howe | 285/341 |
| 3,512,447 | 5/1970 | Vaughn | 85/61 |
| 3,567,843 | 3/1971 | Collins | 174/51 |
| 4,068,555 | 1/1978 | Volkman | 85/61 |
| 4,273,405 | 6/1981 | Law | 339/94 R |
| 4,387,267 | 6/1983 | Becker | 174/65 SS |
| 4,408,936 | 10/1983 | Williamson | 411/3 |
| 4,427,326 | 1/1984 | Hobson et al. | 411/5 |
| 4,513,172 | 4/1985 | Matsui | 174/65 SS |
| 4,575,274 | 3/1986 | Hayward | 403/2 |

FOREIGN PATENT DOCUMENTS 854792 11/1960 United Kingdom .

Primary Examiner—Arthur T. Grimley
Assistant Examiner—David A. Tone
Attorney, Agent, or Firm—Eric J. Groen; Katherine A. Nelson

[57] ABSTRACT

A fitting for establishing a seal between an insulated electrical cable (70) and an electrical junction box, where the junction box wall has a threaded bore and a profiled through-hole having a camming surface and shoulder. The fitting includes a threaded nut (50) and a ferrule (30) which has tines (34) extending from a ring portion. The ferrule (30) and the nut (50) are slid over the insulated cable (70) and the assembly is brought in registry with the threaded bore (8) of the junction box. Screwing the nut (50) and ferrule (30) forwardly causes the tines (34) on the ferrule (30) to contact the camming surface (12), forcing the tines (34) into the insulation (72) and the insulation (72) into the shoulder (16), thereby establishing a sealed connection. In a further improvement, the nut (50) has first and second wrench-engaging portions (100, 101) formed integrally therewith. The first wrench-engaging portion (100) partially fractures at a predetermined torque level corresponding to more than a desired minimum axial pull-out force on the cable (70). However, the structural integrity of the nut (50) is maintained, such that a wrench (105) may be applied to the second wrench-engaging portion (101) of the nut (50) for removing the nut (50).

20 Claims, 8 Drawing Sheets

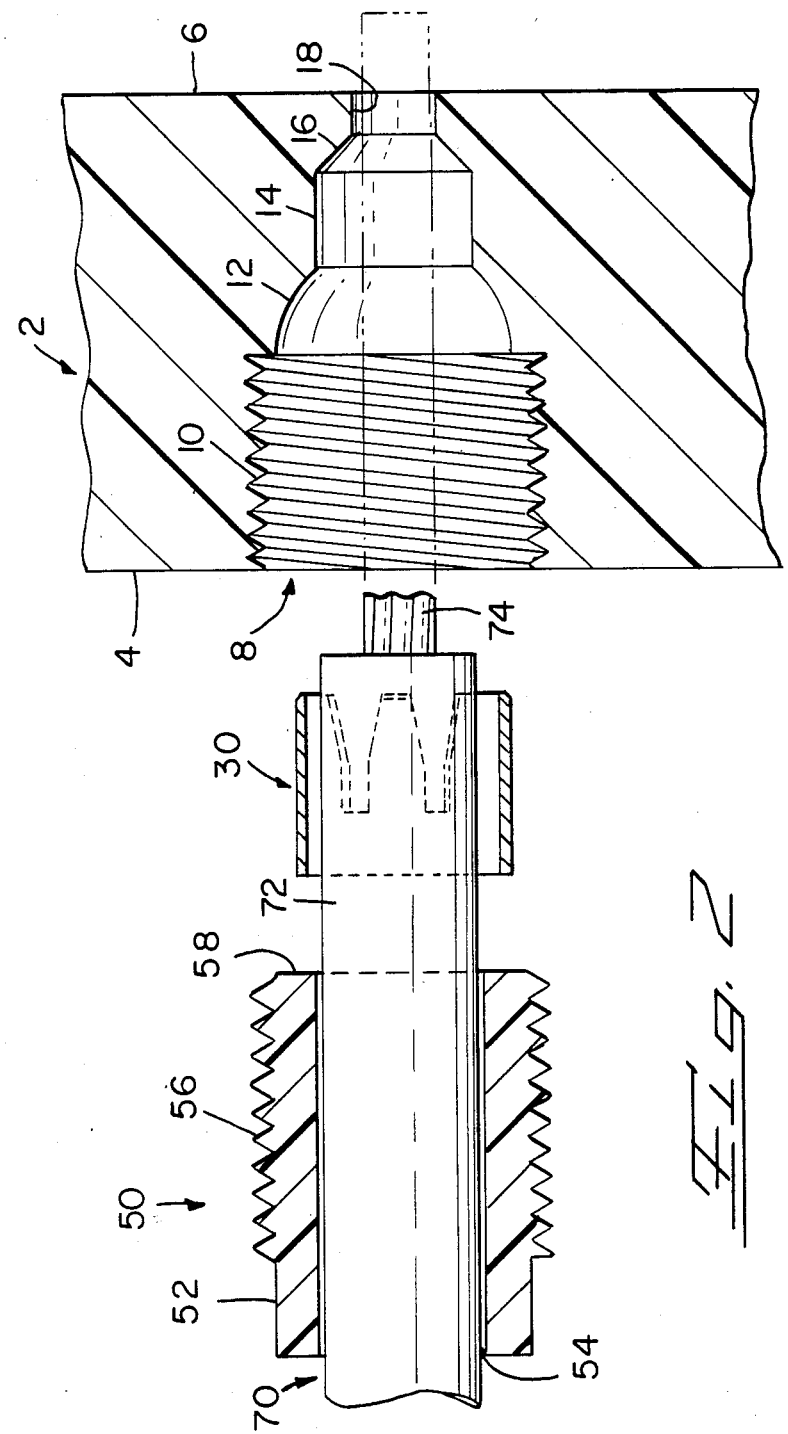

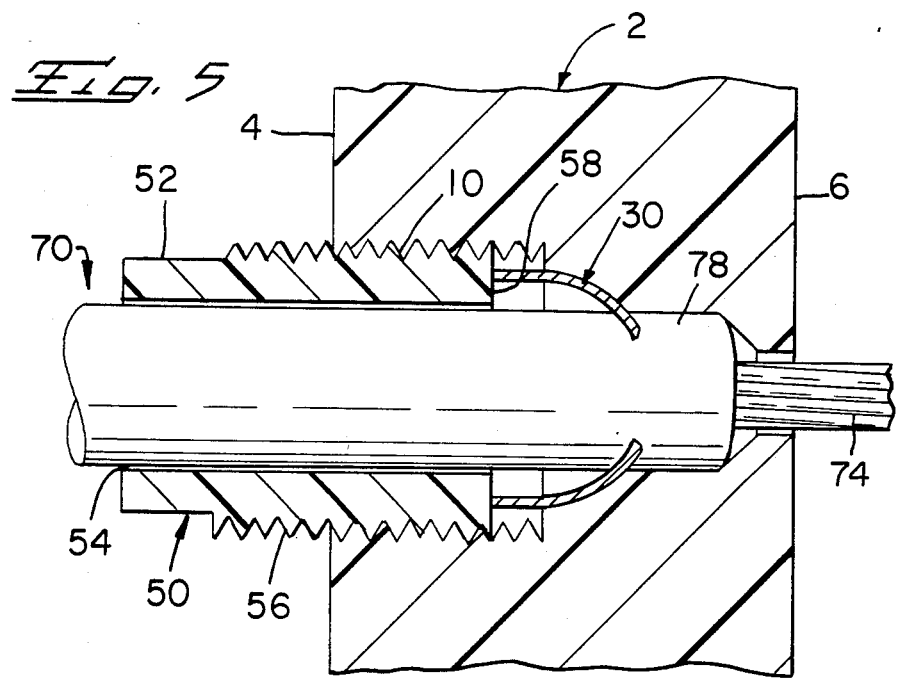
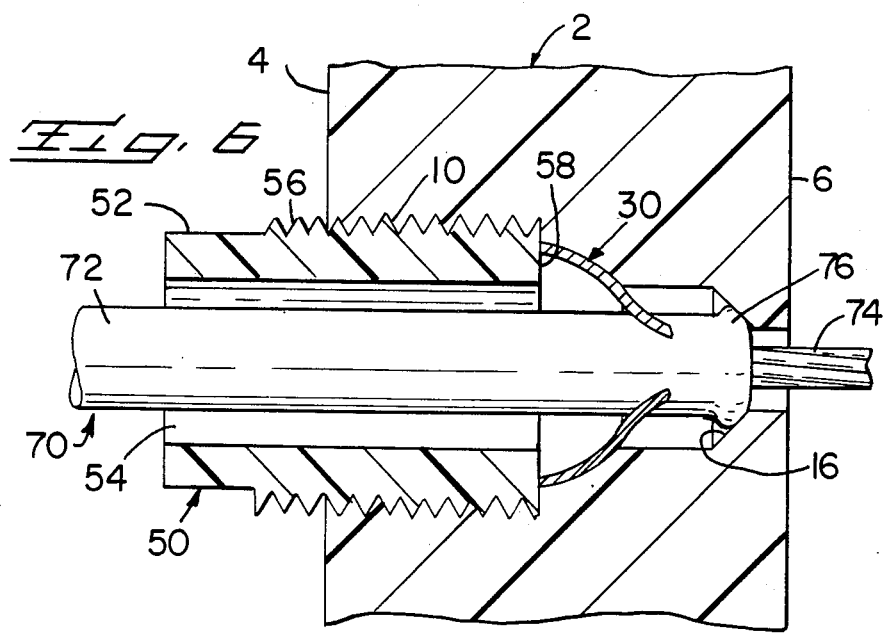

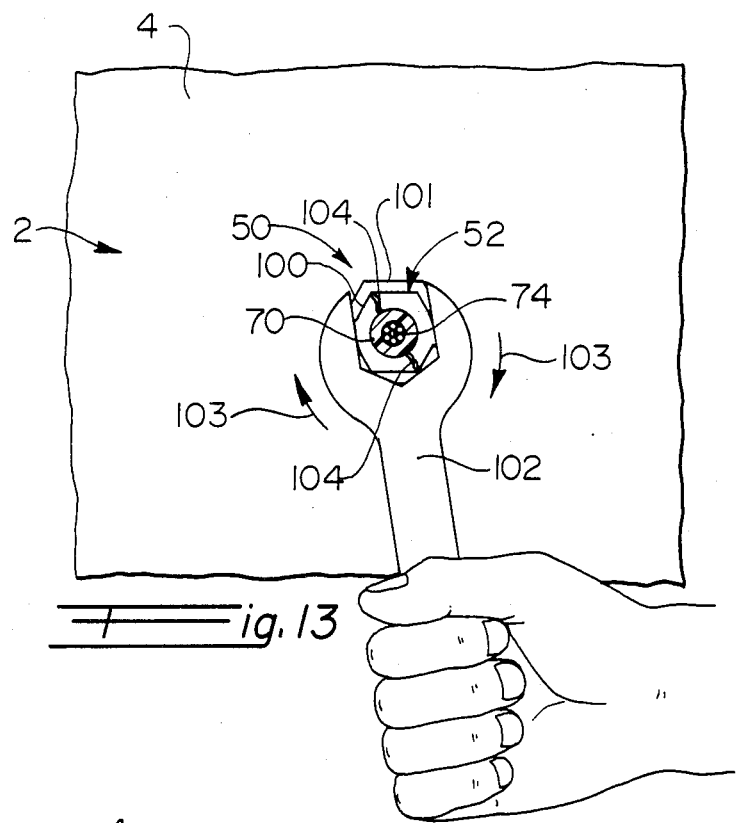
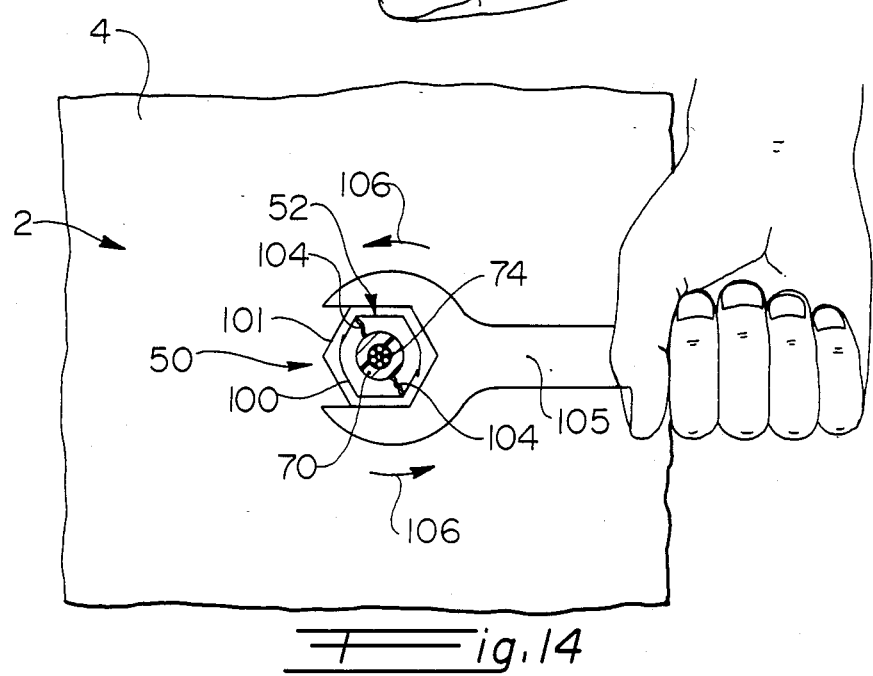

ASSEMBLY FOR AN ELECTRICAL CABLE PROVIDING STRAIN RELIEF AND A WATER-TIGHT SEAL

CROSS-REFERENCE TO RELATED APPLICATION

The present application constitutes a continuation-in-part of application Ser. No. 843,908 filed Mar. 25, 1986, now abandoned, the disclosure of which is incorporated herein by its entirety.

BACKGROUND OF THE INVENTION

1. Field of the Invention

The instant invention relates to a threaded fitting and ferrule for installing in a profiled through-hole of a bulkhead or the like, which, when inserting a cable (or wire) therethrough and threading the fitting into the bulkhead sequentially provides for both a water tight seal and a strain relief.

2. Prior Art

It is a common problem when an electrical connection must be subject to withstanding outdoor usage, as the climate (particularly rain and moisture) can degrade an electrical connection to the point of allowing no current flow. Typically in such a situation, a cable having insulation therearound will provide the conductor with ample protection. The conductor must, however, be terminated at some point to an electrical connector, and the electrical connector will most likely be enclosed in a sealed junction box. In order to protect the electrical interconnection inside the sealed junction box, the entry for the cable into the junction box must also be sealed. Typically, a fitting of some sort is provided having an opening passing through the fitting for the cable to pass through and a threaded portion for connection to the box. Most of the sealed fittings heretofore have utilized a gasket, O-ring or the like which too often are subject to degradation from adverse weather.

U.S. Pat. No. 3,567,843, for example, discloses such a connector. This fitting includes an externally theaded nut and an internally threaded and mating body, the body portion having a ramped or cam surface on the inner diameter. Disposed between the nut and body is a grommet having a ramped surface matching the ramp on the body portion, such that when the body and nut are threaded together, the body portion wedges the grommet radially inwardly towards the cable.

U.S. Pat. No. 4,273,405 also discloses a sealed fitting having an internally threaded member and a mating and externally threaded nut. Once again, a sealing ring and a retaining ring are installed, each of which is subject to weather degradation. Furthermore, the number of components required to complete the seal relates to the purchase price of the fitting and also to the ease of field installation and/or repair.

Another fitting is known which utilizes a collet having threads therearound for mating with a domed sealing nut. Installed in the collet is a sealing ring, which, when the nut and collet are threaded together, compresses radially inwardly due to the radial inward movement of the collet.

In addition, when the fitting is being tightened, as for example, when a threaded fitting is being screwed into an internally-threaded opening in a wall or bulkhead of a junction box, there is no convenient means to determine if the proper torque on the fitting has been reached and, therefore, no convenient means to determine if the cable within the fitting could withstand at least a desired minimum axial pull-out force for a proper strain relief. The use of special torque-releasing wrenches to be applied to the fitting is generally impractical, besides being time consuming, especially since the installation personnel may be semi-skilled and are often required to perform their work under difficult conditions.

Accordingly, it would be desirable to assure a proper strain relief as well as a water-tight seal for the cable. More specifically, it would be desirable to guarantee that the cable is retained in the bulkhead to meet a desired minimum axial pull-out force on the cable. For example, for underground feeder ("U.F.") cables used in the solar industry, it is necessary to assure a minimum of a twenty pound pull-out force on the cable in order to meet Underwriters Laboratory ("U.L.") specifications.

SUMMARY OF THE INVENTION

It is an object of the instant invention to establish a sealed connection between an insulated cable and a junction box without having to use a rubber grommet, a gasket, or an O-ring.

It is a further object of the instant invention to provide a seal mechanism that is field repairable without having to replace existing seal components.

It is a further object of the instant invention to provide a fitting assembly which both establishes the sealing arrangement and provides for a strain relief.

The instant invention accomplishes the foregoing objectives by using the insulation of an insulated cable for the sealing mechanism between a fitting and a bulkhead wall such as a junction box. The bulkhead wall has a profiled through-hole utilizing three concentric bore sizes, each bore decreasing in diameter from the outside to the inside wall of the bulkhead wall. The first and second diameters are joined by a radiussed surface while the second and third diameters are joined by a chamfered surface. The first bore is internally threaded to mate with an externally threaded nut.

The nut is formed from a plastic material and has a bore extending therethrough which allows the nut to be slidably placed over the cable. A metal ferrule is also utilized, which is also slidably placed over the cable between the nut and the bulkhead. The ferrule has tines in circumferential disposition around the periphery of the ferrule, the tines facing the through-hole as it is slid over the cable. As the exposed conductor of the cable is inserted into the through-hole, the conductor portion passes completely through the wall, through the third bore, and is disposed in the interior of the box for termination therein. The cable is inserted into the through-hole until the insulation bottoms out on the chamfered portion between the second and third bores.

The nut is then slid forward, and the threaded portion of the nut is threaded with the threaded portion of the first bore. Continued threading drives the tines of the ferrule up against the radiussed surface forcing the tines radially inwardly towards the axial centerline of the cable. The tines engage the insulation and force the insulation further forwardly against the chamfered surface. The insulation is sufficiently displaced against the chamfered surface, thereby effecting a sufficient moisture seal and a strain relief.

Alternatively, the ferrule and nut can be placed into the through-hole of bulkhead, the ferrule slid into the first bore, and the nut partially threaded into the threaded portion of the bore. The prepared conductor may then be inserted into the through-hole and extended through the nut and ferrule until the insulation abuts the shoulder and the conductor extends through the third bore.

In accordance with the further teachings of the present invention, there is herein illustrated and described (in combination with an electrical cable passing through a bore in a bulkhead) an assembly for assuring a proper strain relief on the cable, such that the cable will withstand a desired minimum axial pull-out force. The assembly includes a nut having an externally-threaded portion and further having an axial bore formed therethrough for receiving the cable. The bore in the bulkhead has a forward portion provided with internal threads adapted to receive the externally-threaded portion of the nut, and the bore in the bulkhead further has a forward portion. A member is carried by the cable and is disposed between the nut and the forward portion of the bore in the bulkhead. This member has at least a portion thereof adapted to be compressed radially inwardly thereof to engage the cable and to prevent the cable from being pulled out of the bulkhead upon the application of a predetermined minimum axial force on the cable, thereby providing a proper strain relief for the cable. The nut has a first wrench-engaging portion formed integrally therewith for facilitating rotation of the nut in a first direction into the threaded portion of the bore in the bulkhead. This first wrench-engaging portion of the nut is adapted to partially fracture at a torque level corresponding at least to, and preferably to about two to three times, the desired minimum axial pull-out force on the cable (hereinafter referred to as a "predetermined torque level"), thereby preventing further rotation of the nut in the first direction while still maintaining the structural integrity of the nut. The nut further has a second wrench-engaging portion for facilitating rotation of the nut in a second and opposite direction for removing the nut from the bulkhead.

Preferably, the first wrench-engaging portion of the nut partially fractures at the predetermined torque level, such that the first wrench-engaging portion of the nut does not become totally separated from the nut. In the preferred embodiment, the second wrench-engaging portion of the nut is larger than the first wrench-engaging portion thereof; and the first and second wrench-engaging portions of the nut are hexagonally formed.

Preferably, the material of the nut and its integrally-formed first and second wrench-engaging portions thereof comprises a glass-filled polyester. The glass-filled polyester includes 15%–35% glass; and in a preferred embodiment, includes 18%–30% glass.

Viewed in yet another aspect, the present invention provides a proper strain relief on a cable passing through a bore formed in the bulkhead of an electrical junction box or the like, wherein the cable will withstand a desired minimum axial pull-out force, and wherein a water-tight seal will be provided for the cable, the cable having insulation thereon. This assembly comprises a nut having an externally-threaded portion and further having an axial bore formed therethrough for receiving the cable. The bore in the bulkhead includes a forward portion provided with internal threads adapted to receive the externally-threaded portion of the nut. The bore in the bulkhead further includes a forward portion having a shoulder and further having a camming surface between the shoulder and the internal threads in the bore. A ferrule is carried by the cable forwardly of the nut. This ferrule has a plurality of circumferentially-spaced tines extending substantially forwardly and axially thereof towards the camming surface in the forward portion of the bore. When the nut is threaded into the bore in the bulkhead, the nut drives the ferrule forwardly, and the tines on the ferrule engage the camming surface and are depressed radially inwardly thereof to engage the insulation on the cable, thereby providing a strain relief for the cable, while pressing at least a portion of the insulation against the shoulder, thereby providing a water-tight seal for the cable. The nut includes means thereon for precluding further rotation of the nut in a first nut-tightening direction upon the application of a predetermined torque on the nut, corresponding to more than the desired minimum axial pull-out force on the cable, thereby assuring a proper strain relief on the cable. This last-named means assures the structural integrity of the nut and accommodates rotation of the nut in a second and opposite direction for removal of the nut from the bulkhead.

These and other objects of the present invention will become apparent from a reading of the following specification, taken in conjunction with the enclosed drawings.

BRIEF DESCRIPTION OF THE DRAWINGS

FIG. 2 shows a cross-sectional view through the components of the preferred embodiments.

FIG. 5 shows a cross-sectional view through the center of the components with a large cable through the bulkhead.

FIG. 6 shows a cross-sectional view through the center of the components with a small cable through the bulkhead.

FIG. 13 is a still further front elevational view, corresponding substantially to that of FIG. 12, but showing how the corners of the hexagonally-formed first wrench-engaging portion of the nut will be rounded off or will crumble to preclude the application of additional torque to the nut in the first nut-tightening direction.

FIG. 14 is a yet still further front elevational view, corresponding substantially to that of FIGS. 11-13, but showing how a larger open-ended wrench may be applied to the second wrench-engaging portion of the nut to rotate the nut in a second (and opposite) direction for removing the nut from the bulkhead.

DETAILED DESCRIPTION OF THE PREFERRED EMBODIMENTS

The instant invention relates to a fitting for securing a cable to a bulkhead, and more specifically it relates to a fitting for moisture sealing of a cable, and for providing a strain relief.

Figures 1, 3, 4:
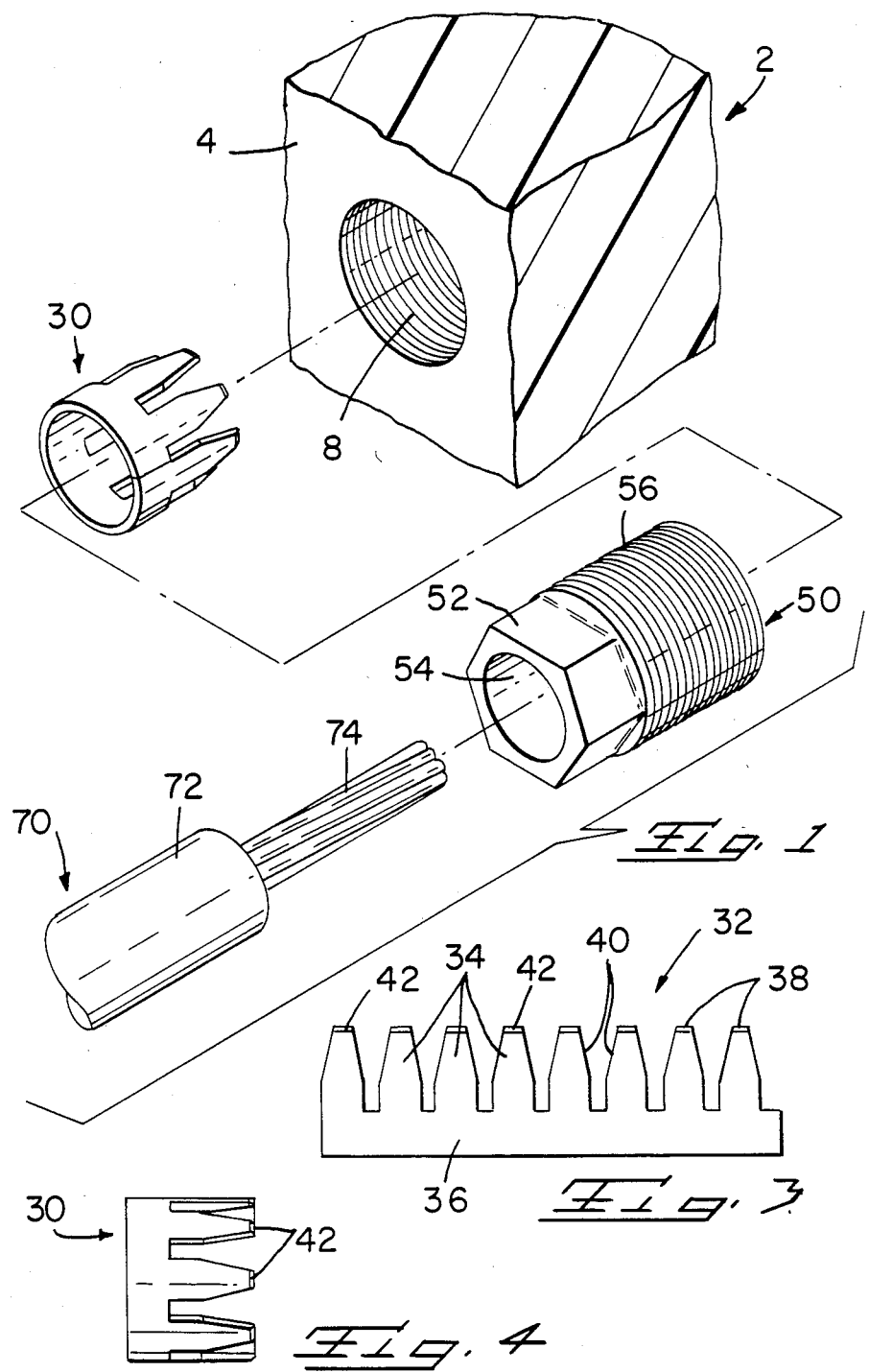
FIG. 1 is a perspective view of a preferred embodiment showing the components exploded.
FIG. 3 shows the flat blank stamping prior to being rolled into the ferrule.
FIG. 4 shows the ferrule after having been rolled.
Figure 7:
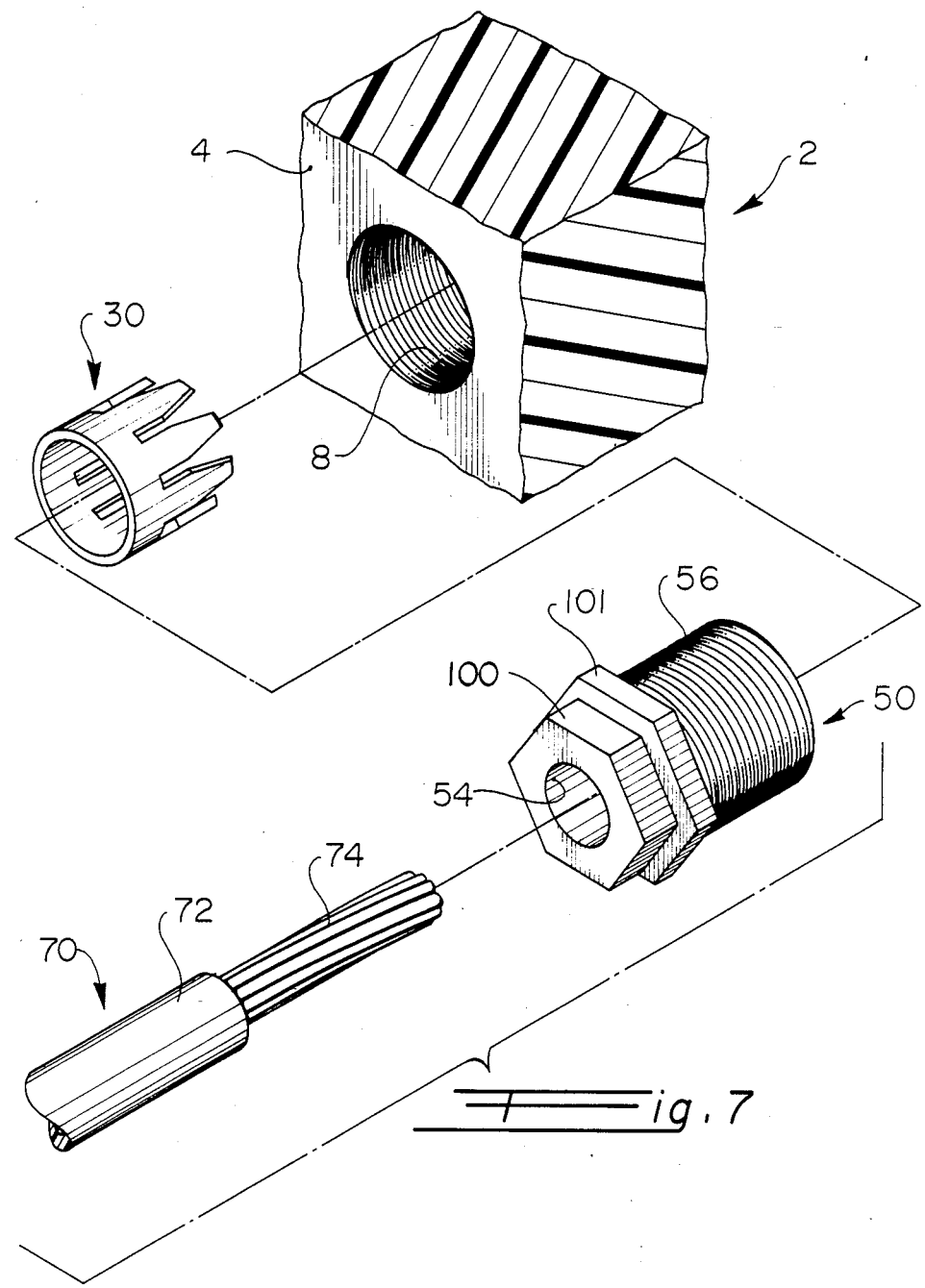
FIG. 7 is an exploded perspective view of an alternatively preferred embodiment of the present invention, corresponding substantially to that of FIG. 1, but showing first and second wrench-engaging portions of the nut formed integrally therewith, the first wrench-engaging portion being partially frangible so as to partially fracture or split upon the application of a predetermined torque level to the nut.
Figure 8:
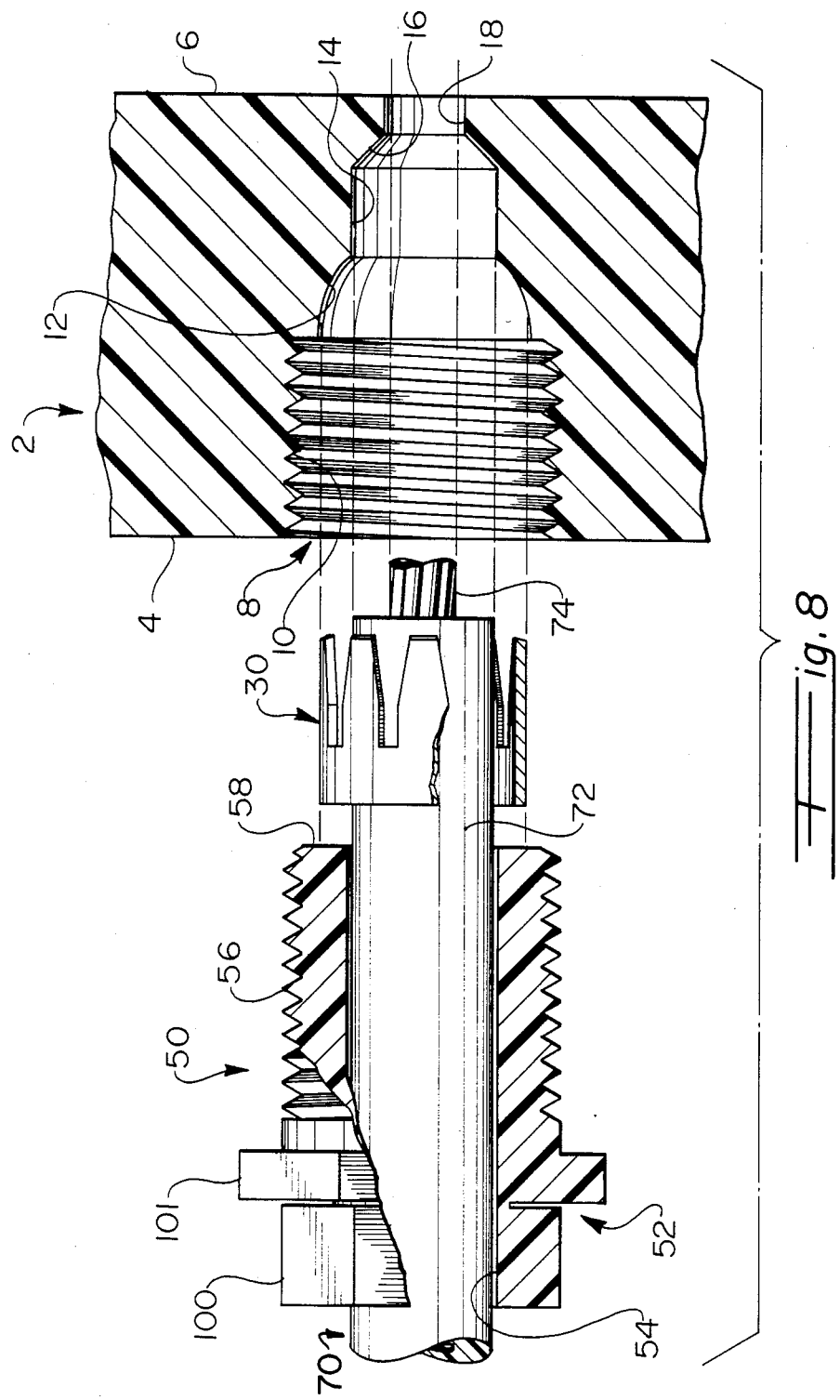
FIG. 8 is an exploded longitudinal section of the assembly of FIG. 7 (with certain parts thereof being shown partially in elevation) corresponding substantially to that of FIG. 2, but illustrating the alternate embodiment of the invention.
Figure 9:
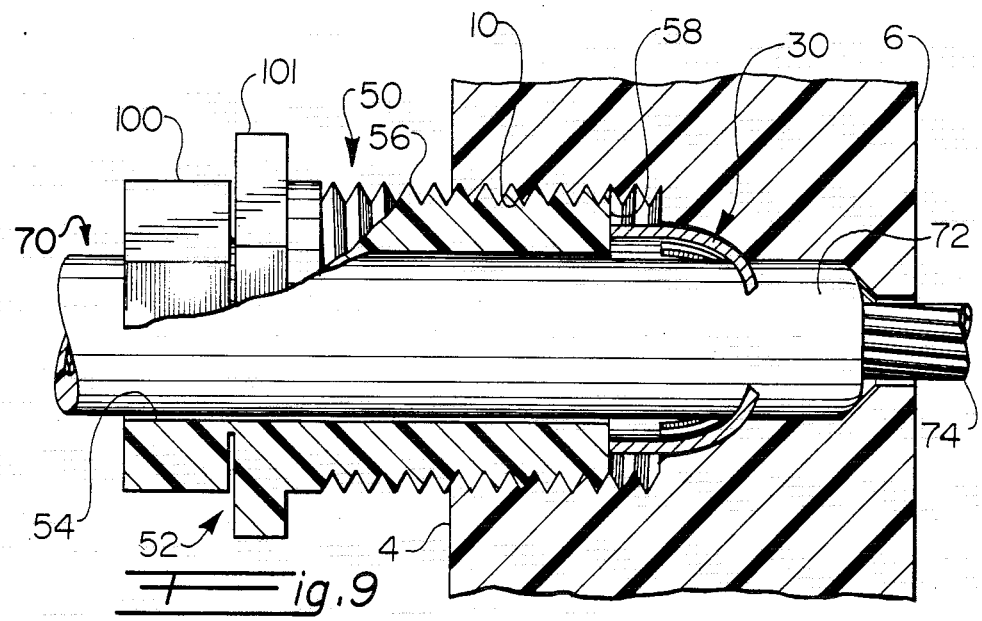
FIG. 9 is a longitudinal section of the assembly of FIG. 8 (with certain parts thereof being shown partially in elevation) corresponding substantially to that of FIG. 5, but showing the alternate embodiment of the present invention for providing the desired strain relief and water-tight seal for the cable.
Figure 10:
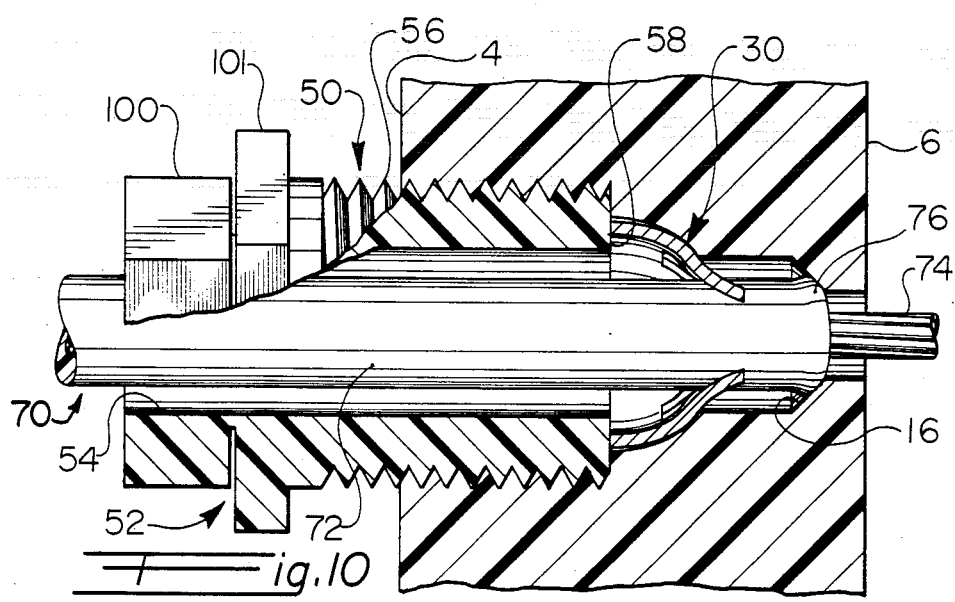
FIG. 10 is a further longitudinal section corresponding substantially to that of FIG. 9, but showing a smaller-diameter insulated cable retained within the bore in the bulkhead.

Referring more specifically to FIG. 1, there is shown generally a cable 70 to be inserted through both a nut portion 50 and a ferrule 30, the assembly then inserted into a through-hole 8 in a bulkhead 2. Referring now to FIG. 2, there is shown in greater detail the bulkhead 2 which includes a wall having an outer or exposed surface 4 and an internal or unexposed surface 6. The bulkhead 2 is shown in FIG. 2 as simply a wall, but it should be understood that the bulkhead 2 could comprise any type of junction box where the inner box must be waterproof as it contains circuitry that is subject to degradation from moisture. Regardless of the structure to which the bulkhead 2 pertains, the bulkhead 2 will have an outer through-hole 8 which leads into the internal structure of the housing. The bulkhead 2 then contains a first cylindrical bore having straight threads 10 which extend into, but not completely through, the bulkhead wall 2. The through-hole 8 is axially aligned with and in transition with a radiussed surface 12. Further recessed into the bulkhead 2 and contiguous with the radiussed surface 12 is a second cylindrical bore section 14. Cylindrical section 14 is then in transition with a third cylindrical section 18, section 18 having a smaller diameter than that of cylindrical section 14. The cylindrical portion 14 is in transition with cylindrical portion 18 through chamfered portion 16.

Referring again to FIG. 1, a metal ferrule 30 is shown being inserted into the through-hole 8. Metal ferrule 30 is stamped and formed from a flat metal sheet, as shown in FIG. 3, such as brass, or stainless steel, which too, is weather-resistant and non-degradable. As stamped, the blank 32 includes a band portion 36 and a plurality of circumferentially-spaced tines 34 extending axially and forwardly therefrom. Tines 34 have distal portions 38, adjacent and oppositely facing beveled surfaces 40, and chamfered surfaces 42. Blank 32 is rolled into a cylindrical shaped configuration, the rolled configuration resembling a crown, as shown in FIGS. 1 and 4. Alternatively, the ferrule could be a solid tube (not shown) having the tines cut therein.

Referring next to FIG. 2, nut portion 50 includes a cylindrical aperture 54 extending the entire length of the nut 50 having a uniform diameter. The nut 50 further includes straight threads 56, driving surface 58 and hexagonal wrench portions 52.

The cable 70 consists of insulation 72 and conductor portion 74. Although a stranded wire is shown being installed on the bulkhead, a solid core wire or a multiconductor cable could also be used and inserted through the bulkhead and sealed.

The subject invention may be used to seal cables such as those disclosed, when the cable is to be used in a local area where there is no protection from the elements, such as rain and other environmental pollutants. As the conductor 74 itself is securely covered by non-degradable insulation 72, it is protected from any rain or other moisture. However, when one of the conductor ends must be terminated to an electrical connector, that end of the conductor must be protected. One example of the use of the instant invention is in the area of solar photovoltaic modules, when a conductor end must be locally mounted to an electrical connector within a junction box mounted on the solar module, yet the local environment for the entire system is, by its very nature, outdoors in an unprotected area.

In order to use the instant invention in the manner as aforementioned, the cable 70 is inserted into the through-hole 54 of the nut portion 50, the nut portion 50 freely sliding completely over the cable 70. The ferrule 30 is then slidably received over the cable also as shown in FIG. 2. The cable 70, the nut portion 50 and ferrule 30 are inserted into the through-hole 8, the conductor 74 projecting completely through the bulkhead 2 through the conductor opening 18. If the conductor is misaligned as the conductor enters the opening 18, the chamfered portion 16 realigns the conductor and centers it with the opening 18. The only portion of the cable protruding through the wall 2 is the conductor portion 74. The insulation portion of the cable will not project through the wall, as the insulation 72 contacts the chamfered surface 16.

Alternatively, the ferrule 30 and nut 50 can be placed into the through-hole 8 of bulkhead 2, the ferrule slid into the first bore 10, and the nut partially threaded into the threaded portion of bore 10. The prepared cable 70 may then be inserted into the through-hole 8 and extended through the nut 50 and ferrule 30 until the insulation 72 abuts the shoulder 16 and the conductor 74 extends through the third bore 18.

The instant invention is also suitable for cables of different gauges. For example, if a large diameter cable is used, the diameter of the cable will be substantially the same as the inner diameter of the cylindrical portion 14 of through-hole 8. If the large cable is to be used, after the cable is inserted into the through-hole until the insulation abuts the chamfered surface 16, the nut portion 50 is then slid towards the through-hole 8, also causing the ferrule portion 30 to be slid into the through-hole 8. The nut portion 30 is then inserted into through-hole 8 and turned until the threaded portion 56 begins to thread itself in the threads 10 of the through-hole 8. Continued turning of the nut portion 50 causes the driving surface 58 of nut portion 50 to drive the ferrule 30 axially and forwardly, the distal surfaces of the ferrule portion 30 now contacting the radiussed surface 12 of the through-hole 8. As the nut portion is comprised of a plastic material whereas the ferrule is formed of metal, the turning of the nut portion 50 will not turn the ferrule 30, but rather surface 58 slides radially circumferentially to ferrule portion 30 forcing the ferrule 30 in only the axial direction.

As the ferrule is being driven by the nut 50, the chamfered surfaces 42 on the tines 34 contact the radiussed surface 12, which lead the tines inward and allow tines 34 to conform to the geometry of the surface 12. As the tines 34 have beveled surfaces 40, the tines 34 can be bent radially inwardly without the tines overlapping one another. The inward radial movement of the tines forces the distal tips of the tines into the surface of the insulation 72 of the cable only, as shown in FIG. 5, not completely through the insulation so as to contact the conductor itself. The insulation between the tines 34 and between the chamfered surface 16, shown generally as 78 in FIG. 5, is forced radially outwardly against the cylindrical wall portion 14, and is also forced axially forwardly against the chamfered surface 16. It is the insulation itself, forced up against the surfaces 14 and 16, which actually acts as the seal for the conductor 74.

If a smaller cable is to be inserted through the bulkhead 2, the nut and ferrule are again inserted over the end of the cable as before mentioned. However, when the nut portion 50 is drawn up tight within the threaded portion 10, the tines 34 of the ferrule 30 flatten out and project axially in to the through-hole 8, and the insulation is forced forwardly against the chamfered surfaces to deform the insulation, as indicated as portion 76 in FIG. 6. Although water can capillary along the cable insulation 72 into the nut opening 54, the water is precluded from entering the conductor opening 18, as the insulation portion 76 is sufficiently pressed against the chamfered surface 16.

The subject assembly also acts as a strain relief, protecting the conductor connection from any tension that may occur on the cable. As shown in either FIG. 5 or 6, if the cable is pulled to the left under some tensile force, the connection between the conductor and an electrical connector (not shown) is jeopardized. However, the instant invention prevents any tension on the cable from reaching the connection between the cable and connector. In the event one of the cables is pulled to the left, as shown in either FIG. 5 or 6, the tines 34 of the ferrule 30 grip the insulation 72 around the conductor, preventing the tension from also pulling the conductor 74, thereby affecting the conductor interconnection.

If the cable 70 must be removed for field repair of the module, or the like, the conductor and fitting may be removed without damaging the insulation for later use. When the conductor is to be replaced in the through-hole, the same components may be reused, as all components are non-degradable and reusable. The ferrule is composed of brass or stainless steel and the nut of plastic, both of which are non-degradable. The portion of the insulation previously used as the seal (shown at 78 and 76 in FIGS. 5 and 6, respectively) may also be reused. As the outdoor cable insulation is composed of non-degradable polyvinyl chloride (PVC) the insulation 72 does not set up as do elastomeric gaskets. Even if the insulation portions 78, 76 are somehow damaged in the removal, a portion of the insulation 72 may simply be sliced off, the collet 30 pulled further back, and the cable and fitting replaced for reuse.

The instant invention thus relates to a fitting for establishing a sealed connection between an insulated cable and a junction box, or the like, without the need for gaskets, seals or O-rings. The insulation 72 itself of the insulated cable 70 is used to seal the conductor within the junction box. The instant invention also provides a sealing mechanism that is field repairable without having to replace existing sealing components, as all components of the instant invention are non-degradable and reusable. Finally, the instant invention acts as both a sealing means and a strain relief means.

With reference to FIGS. 7-14, an alternate embodiment of the present invention is illustrated, wherein the nut 50 is provided with a first wrench-engaging portion 100 and a second wrench-engaging portion 101 formed integrally therewith. Preferably, the second wrench-engaging portion 101 is larger than the first wrench-engaging portion 100, and both wrench-engaging portions 100 and 101 are hexagonally formed. To facilitate use with tools dimensioned in metric units as well as tools dimensioned in American standard units, two of the flats of the hexagon may be sized in accordance with one system and four in the other.

Figure 11:
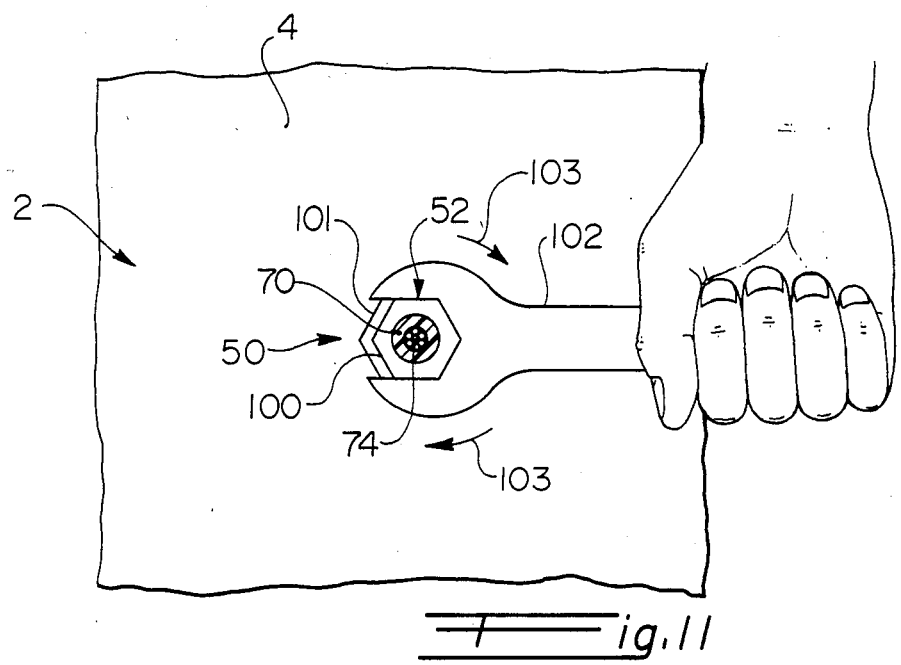
FIG. 11 is a front elevational view of the assembly of the alternate embodiment (of FIGS. 7–10) showing the use of an open-ended wrench for engaging the first wrench-engaging portion of the nut for tightening the nut within the internally-threaded bore in the bulkhead.

As shown in FIG. 11, the first wrench-engaging portion 100 of the nut 50 may be engaged by an open-ended wrench 102 (or other suitable tool) to rotate the nut 50 in a first direction to tighten the nut 50 in the internal threads 10 in the bore 8 of the bulkhead 2, as indicated by the arrows 103.

Figure 12:
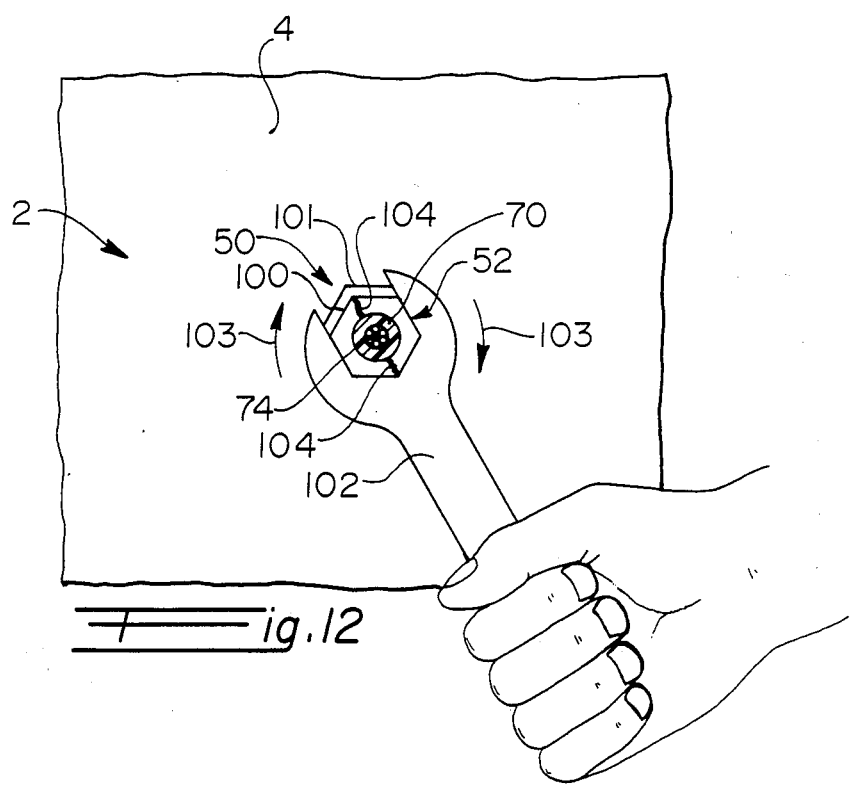
FIG. 12 is a further front elevational view, corresponding substantially to that of FIG. 11, but showing how the first wrench-engaging portion of the nut laterally splits at the predetermined torque level corresponding substantially to the desired minimum axial pull-out force on the cable.

When a predetermined torque level is reached on the nut 50, the first wrench-engaging portion 100 of the nut 50 will develop one or more lateral splits, as at 104, as shown in FIG. 12. This predetermined torque level corresponds preferably to more than the desired minimum axial pull-out force on the cable 70. Thereafter, continued attempted torquing of the nut 50 merely results in a rounding off of the hexagonal corners of the first wrench-engaging portion 100 of the nut 50, as shown more clearly in FIG. 13.

Preferably, the first wrench-engaging portion 100 of the nut 50 is partially frangible or fracturable, as illustrated somewhat schematically by the splits 104 in FIGS. 12 and 13, such that two advantages are obtained: first, the integrity of the nut 50 is maintained; and second, the first wrench-engaging portion 100 is not completely broken off of the nut 50. Otherwise, if the first wrench-engaging portion 100 of the nut 50 would be completely broken off of the nut 50, the portion 100 would then be free to slide along the length of the cable 70 externally of the bulkhead 2, thereby requiring the first wrench-engaging portion 100 to be severed or otherwise suitably removed from the cable 70. This removal would be time consuming and inconvenient.

The nut 50 is preferably a unitary article integrally molded from a suitable plastic material. Preferably, the material comprises a glass-filled polyester resin including 15%-35% glass. In a preferred embodiment, the glass-filled polyester resin includes 18%-30% glass.

Although the first wrench-engaging portion 100 of the nut 50 is partially frangible, nevertheless, and as herein noted, the structural integrity of the nut 50 is maintained. As a result, whenever it is desired to remove the nut 50 from the bulkhead 2, a larger open-ended wrench 105 (or other suitable tool) may be applied to the second wrench-engaging portion 101 of the nut 50, as shown more clearly in FIG. 14, to rotate the nut 50 in a second (and opposite) direction as indicated by the arrows 106, to remove the nut 50 from the bulkhead 2. For re-installation, a new nut 50 would be used.

The cable 70 is a twisted multi-strand single conductor cable, as shown in the drawings. However, it will be appreciated that any suitable cable may be employed, consonant with the teachings of the present invention.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An assembly for establishing a sealed interconnection for an insulated electrical cable, the assembly comprising:
   a bulkhead, having a through-hole extending from an outside to an inside surface and having three concentric bores, a first bore being internally threaded and extending from the outside surface into the bulkhead, a second bore spaced apart from the first bore by a camming surface, and a third bore in transition with the second bore by means of a shoulder, the third bore extending to the inside surface;
   a nut portion having an axial bore extending therethrough, said bore having a diameter greater than the diameter of said insulated cable, and an externally threaded portion matable with said internal threads on said first bore; and
   a ferrule of cylindrical shape having a band portion and a plurality of radially disposed tines extending from said band portion in an axial direction, said ferrule being slidably receivable over said insulated cable; whereby
   when said cable is prepared by removing a portion of the insulation therefrom exposing a length of the conductor, the nut portion and the ferrule are slid over the prepared end of the cable, and the cable inserted into the through-hole until the insulation abuts the shoulder and the conductor extends through the third bore, bringing the threads of said nut into registry with the threads of the first bore and screwing the nut forward into the through-hole causes the tines of said ferrule to contact the camming surface and forces the tines radially inward and into the insulation of the cable, and drives the insulation axially forward against the shoulder, thereby establishing a sealed interconnection.

2. The assembly of claim 1 wherein the shoulder is chamfered, leading from the second bore into the third bore.

3. The assembly of claim 1 wherein the bulkhead is an outer wall of a sealed electrical junction box.

4. The assembly of claim 1 wherein the camming surface is profiled as a concave radius.

5. The assembly of claim 1 wherein the ferrule is stamped and formed from a flat metallic sheet.

6. The assembly of claim 1 further including an electrical cable, wherein the cable is provided with insulation and has a conductor therein; wherein a portion of the insulation on the cable is removed to expose a length of the conductor adapted to extend forwardly of the bore in the bulkhead; and wherein the nut exerts an axial compressive force on the member, such that the member engages the insulation on the cable and compresses the cable against the forward portion of the bore in the bulkhead to thereby provide a water-tight seal for the cable.

7. A method for establishing a sealed interconnection for an insulated cable, comprising the steps of:
   stripping away a portion of the insulation of the cable exposing a length of the conductor;
   placing over the prepared end of the cable a nut portion having an axially extending bore and an externally threaded portion;
   placing over the prepared end of the cable a ferrule of cylindrical shape having a band portion and a plurality of radially disposed tines extending from said band portion;
   placing the prepared end of the cable, the ferrule and the nut into a bulkhead having a through-hole extending from an outside to an inside surface and having three concentric bores, a first bore being internally threaded and extending from the outside surface into the bulkhead, a second bore which is spaced from said first bore by a camming surface, and a third bore in transition with the second bore by means of a shoulder, the third bore extending to the inside surface;
   projecting the cable into the through-hole until the insulation abuts the shoulder and the length of the exposed conductor extends through the third bore; and
   threading the nut into the threaded portion of the first bore until the tines of the ferrule are projected into the insulation by the action of the camming surface and the insulation is forced into the shoulder.

8. A method for establishing a sealed interconnection for an insulated cable, comprising the steps of:
   placing a ferrule into a through-hole of a bulkhead, the ferrule having a cylindrical shape having a band portion and a plurality of radially disposed tines extending from said band portion, the through-hole extending from an outside to an inside surface and having three concentric bores, a first bore being internally threaded and extending from the outside surface into the bulkhead, a second bore which is spaced from said first bore by a camming surface, and a third bore in transition with the second bore by means of a shoulder, the third bore extending to the inside surface;
   placing a nut into said threaded portion of said first bore, said nut having a threaded portion and an axially extending bore therethrough;
   preparing an insulated cable by tripping a portion of said insulation away exposing a length of a conductor;
   placing the prepared end of the cable through the axial bore of the nut and through the ferrule, until the exposed conductor projects through the third bore and the insulation abuts the shoulder; and
   screwing the nut into the threaded portion of the first bore until the tines of the ferrule project into the insulation under the action of the camming surface, and the insulation is forced against the shoulder.

9. A method for establishing a sealed interconnection for a conductor of an insulated cable, comprising the steps of:
   providing an insulative body means having an inner sealed portion and an outer unsealed portion;
   providing an opening in the insulative body means which communicates between the inner sealed portion and the outer unsealed portion, the opening including a cable receiving portion and a conductor receiving portion where the conductor receiving portion has a smaller profile than the cable receiving portion, thereby defining a shoulder within the opening;
   stripping the insulation from the end of the conductor thereby forming an end of the insulation;
   inserting the cable into the opening such that the conductor is placed within the conductor receiving portion and the insulation abuts the shoulder; and forcing the insulated cable inwardly to create a seal between the end of the insulation and the shoulder.

10. The method of claim 9 wherein the step of forcing the insulated cable inwardly includes the steps of:
further providing within the opening a camming surface;
providing a threaded surface on the insulative body;
providing a threaded nut complementary with the threaded surface;
providing a ferrule having a cylindrical shape with a band portion and a plurality of radially disposed tines extending from the band portion;
placing the nut and the ferrule over the stripped cable and threading the nut and threaded surface together until the tines of the ferrule are projected into the insulation by the action of the camming surface, and the insulation is forced into the shoulder.

11. An assembly for assuring a proper strain relief for interconnection of an insulated electrical cable in a bulkhead such that the cable will withstand a desired minimum axial pull-out force, comprising:
a nut having an externally-threaded portion and further having an axial bore formed therethrough for receiving an electrical cable;
a bore in the bulkhead having a first portion provided with internal threads adapted to receive the externally-threaded portion of the nut, the bulkhead bore further having a forward portion;
a member adapted for receiving the electrical cable therethrough and to be disposed in the bore of the bulkhead between the nut and the forward bore portion, wherein the member has at least a portion thereof adapted to be compressed radially inwardly thereof to engage the cable received therethrough and to prevent the cable from being pulled out of the bulkhead upon the application of a desired minimum axial pull-out force on the cable, thereby providing a proper strain relief for the cable;
the nut having a first wrench-engaging portion formed integrally therewith for facilitating rotation of the nut in a first direction into the threaded portion of the bore in the bulkhead, wherein the first wrench-engaging portion of the nut is adapted to fracture at a predetermined torque level corresponding at least to the desired minimum axial pull-out force on the cable, thereby preventing further rotation of the nut in the first direction while still maintaining the structural integrity of the nut; and
the nut further having a second wrench-engaging portion formed integrally therewith for facilitating rotation of the nut in a second and opposite direction for removing the nut from the bulkhead.

12. The assembly of claim 11, wherein the first wrench-engaging portion of the nut partially fractures at the predetermined torque level, such that the first wrench-engaging portion of the nut does not become totally separated from the nut.

13. The assembly of claim 11, wherein the second wrench-engaging portion of the nut is larger than the first wrench-engaging portion thereof.

14. The assembly of claim 11, wherein the first and second wrench-engaging portions of the nut are hexagonally formed.

15. The assembly of claim 14 wherein the wrench-engaging portions of the nut form an irregular hexagon in that at least one pair of opposite sides of the nut are dimensioned in different units of measurement.

16. The assembly of claim 11, wherein the nut and its integrally-formed first and second wrench-engaging portions comprise a unitary article molded from a glass-filled polyester.

17. The assembly of claim 16, wherein the glass-filled polyester includes 15%-35% glass.

18. The assembly of claim 17, wherein the glass-filled polyester includes 18%-30% glass.

19. An assembly for assuring a proper strain relief for interconnection of an insulated electrical cable in a bulkhead such that the cable will withstand a desired minimum axial pull-out force, the assembly further assuring a water-tight seal for the cable, comprising:
a nut having an externally-threaded portion and further having an axial bore formed therethrough for receiving an electrical cable, the bore in the bulkhead having a first portion provided with internal threads adapted to receive the externally-threaded portion of the nut, the bore in the bulkhead further having a forward portion;
a ferrule adapted for receiving the cable and to be disposed between the nut and the forward portion of the bore in the bulkhead, the ferrule having a plurality of circumferentially-spaced tines, the forward portion of the bore in the bulkhead including a radiussed surface forwardly of the internal threads in the bore;
the cable being provided with insulation and having a conductor therein, a portion of the insulation on the cable being removed to expose a length of the conductor adapted to extend forwardly of the bore in the bulkhead upon inserting the cable through the axial bore of the nut, the ferrule, and the bulkhead bore;
the nut having a first wrench-engaging portion formed integrally therewith for facilitating rotation of the nut in a first direction into the threaded portion of the bore in the bulkhead, whereby the nut drives the ferrule axially and forwardly into the bore, and whereby the tines on the ferrule engage the radiussed surface and are cammed radially inwardly of the bore to engage the insulation on the cable, wherein the first wrench-engaging portion of the nut is adapted to partially fracture at a predetermined torque level corresponding to at least the desired minimum axial pull-out force on the cable, thereby preventing further rotation of the nut in the first direction while still maintaining the structural integrity of the nut;
the nut having a second wrench-engaging portion formed integrally therewith for facilitating rotation of the nut in a second and opposite direction for removing the nut from the bulkhead, the second wrench-engaging portion of the nut being larger than the first wrench-engaging portion thereof, the first and second wrench-engaging portions of the nut being hexagonally formed, and the nut and its integrally-formed first and second wrench-engaging portions comprising a unitary article molded from a glass-filled polyester.

20. The assembly of claim 19, wherein the bulkhead is an outer wall of a sealed electrical junction box.

* * * * *